United States Patent
Toksvig et al.

(10) Patent No.: US 9,154,608 B2
(45) Date of Patent: Oct. 6, 2015

(54) DATA EXCHANGE BETWEEN ANTENNA AND MODEM OF MOBILE DEVICE

(75) Inventors: Michael John McKenzie Toksvig, Palo Alto, CA (US); Yoon Kean Wong, Redwood City, CA (US); Craig Michael Nicol, San Francisco, CA (US); Eglia Nair Flores, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 111 days.

(21) Appl. No.: 13/467,415

(22) Filed: May 9, 2012

(65) Prior Publication Data

US 2013/0301693 A1 Nov. 14, 2013

(51) Int. Cl.
| | |
|---|---|
| *H04B 17/00* | (2015.01) |
| *H04M 1/725* | (2006.01) |
| *H01Q 21/28* | (2006.01) |
| *H01Q 1/24* | (2006.01) |
| *H01Q 21/30* | (2006.01) |
| *H01Q 1/12* | (2006.01) |

(52) U.S. Cl.
CPC ........... *H04M 1/72569* (2013.01); *H01Q 1/243* (2013.01); *H01Q 21/28* (2013.01); *H01Q 21/30* (2013.01); *H01Q 1/1257* (2013.01)

(58) Field of Classification Search
CPC .... H04M 1/00; H04M 1/72569; H04B 1/005; H04B 1/18
USPC ................. 455/41.2, 422.1, 452.1, 280, 26.1, 455/456.6, 418; 375/295, 340, 141, 145, 375/257, 260, 308, 150
See application file for complete search history.

(56) References Cited

U.S. PATENT DOCUMENTS

| | | | |
|---|---|---|---|
| 5,870,302 A * | 2/1999 | Oliver .............................. 700/11 |
| 5,940,408 A * | 8/1999 | Zitting ........................... 370/523 |
| 6,453,371 B1 | 9/2002 | Hampson et al. |
| 7,663,555 B2 * | 2/2010 | Caimi et al. ................... 343/702 |
| 8,193,978 B2 * | 6/2012 | Moshfeghi ............... 342/357.44 |
| 8,406,806 B2 * | 3/2013 | Wong .......................... 455/550.1 |
| 8,583,193 B2 * | 11/2013 | Meitzler et al. ............ 455/575.1 |
| 8,954,024 B2 * | 2/2015 | Tung .......................... 455/278.1 |
| 2001/0016478 A1 * | 8/2001 | Lindenmeier et al. ..... 455/277.1 |
| 2002/0042778 A1 | 4/2002 | Nel |
| 2002/0106995 A1 * | 8/2002 | Callaway, Jr. ................. 455/101 |
| 2004/0127198 A1 | 7/2004 | Roskind |
| 2004/0165568 A1 | 8/2004 | Weinstein |
| 2004/0237114 A1 * | 11/2004 | Drazin .......................... 725/105 |
| 2005/0119035 A1 | 6/2005 | Miyano et al. |
| 2005/0176382 A1 * | 8/2005 | Mochizuki et al. ............. 455/78 |
| 2006/0084395 A1 * | 4/2006 | Kezys et al. ................... 455/101 |
| 2007/0093282 A1 * | 4/2007 | Chang et al. ............... 455/575.7 |

(Continued)

OTHER PUBLICATIONS

International Search Report for PCT Application No. PCT/US2013/040025, Sep. 23, 2013.

(Continued)

*Primary Examiner* — Lana N Le
(74) *Attorney, Agent, or Firm* — Baker Botts L.L.P.

(57) ABSTRACT

In one embodiment, a method includes accessing data encoding a response shift in a signal received through an antenna of a mobile device. The signal corresponds to wireless communication to the mobile device from another device. The response shift is detected and encoded by a modem of the mobile device coupled to the antenna. The method also includes determining an environmental or operational state of the mobile device based at least in part on the response shift encoded in the data.

21 Claims, 5 Drawing Sheets

(56) References Cited

U.S. PATENT DOCUMENTS

2007/0241977 A1* 10/2007 Vance ............................ 343/745
2009/0295648 A1    12/2009 Dorsey et al.
2010/0190460 A1*  7/2010 Beaulieu ..................... 455/278.1
2011/0051868 A1*  3/2011 Roufoogaran et al. ....... 375/350
2012/0057508 A1    3/2012 Moshfeghi
2012/0060043 A1    3/2012 Kim et al.
2012/0071203 A1*  3/2012 Wong .......................... 455/550.1
2013/0252662 A1*  9/2013 Lu et al. ...................... 455/552.1

OTHER PUBLICATIONS

European Examination Report for EP 131669939.2, EPO, pp. 1-7, Aug. 28, 2013.

* cited by examiner

DATA EXCHANGE BETWEEN ANTENNA AND MODEM OF MOBILE DEVICE

TECHNICAL FIELD

This disclosure generally relates to mobile electronic devices.

BACKGROUND

A mobile electronic device, such as a smartphone, tablet device, laptop computer, etc., may be a hand-held computing device with a display screen. The mobile device may provide touch input or a miniature keyboard. Mobile devices may have general computing capabilities for executing one or more applications such as for example, short-message service (SMS), multimedia-messaging service (MMS), e-mail, Internet access, short-range wireless communications (infrared, Bluetooth®), business applications, gaming, or photography. A smartphone is a particular class of mobile device with general computing and telephony capabilities provided through a radio-frequency (RF) communication link whilst moving within a geographic area. The smartphone connects to a cellular network for access to the public telephone network and mobile Internet access.

DESCRIPTION OF EXAMPLE EMBODIMENTS

Figure 1:
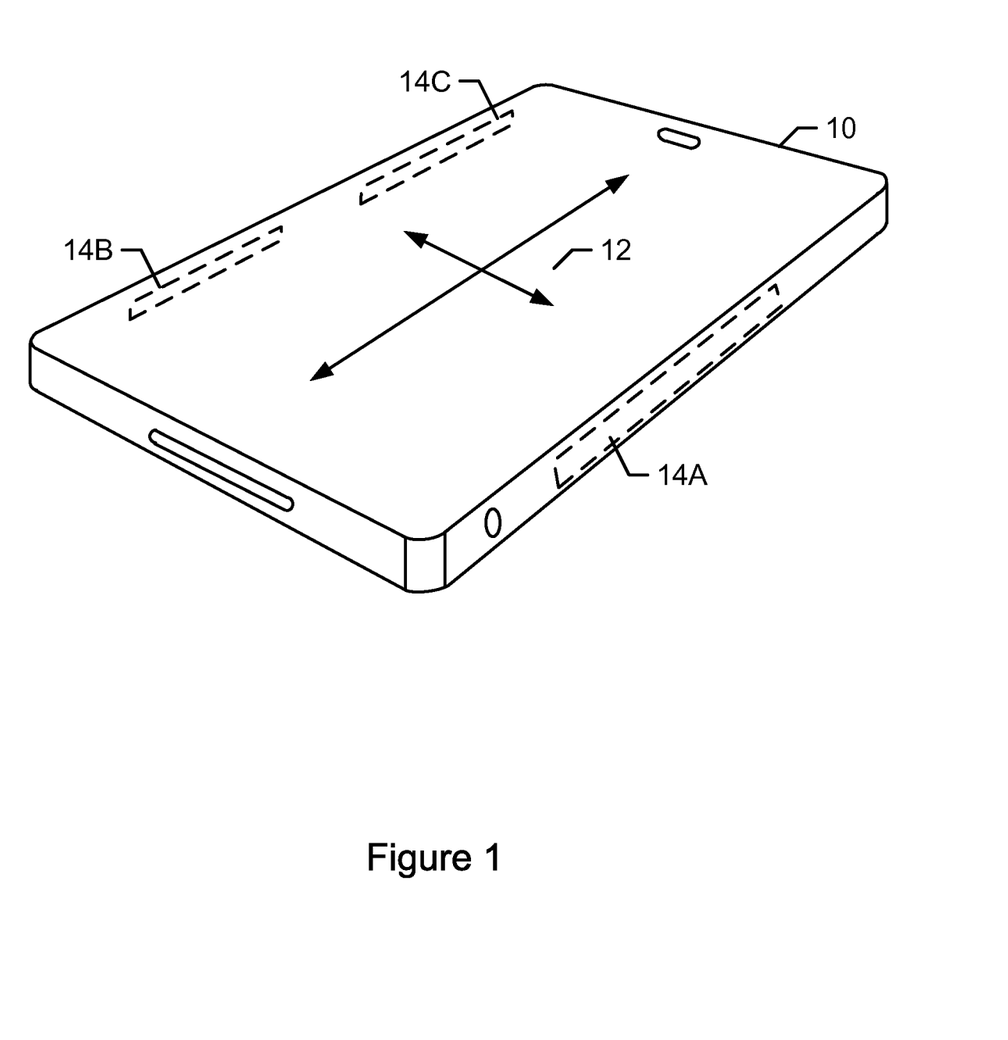
FIG. 1 illustrates an example mobile device.

FIG. 1 illustrates an example mobile device. This disclosure contemplates mobile device 10 taking any suitable physical form. As example and not by way of limitation, mobile device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 10 may have a touch screen 12 as an input component. In the example of FIG. 1, touch screen 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied current as electromagnetic (EM) waves. During reception of signals, antennae 14A-B convert the power of an incoming EM wave into a voltage at the terminals of antennae 14A-B. The voltage may be transmitted to a receiver for amplification.

Figure 2:
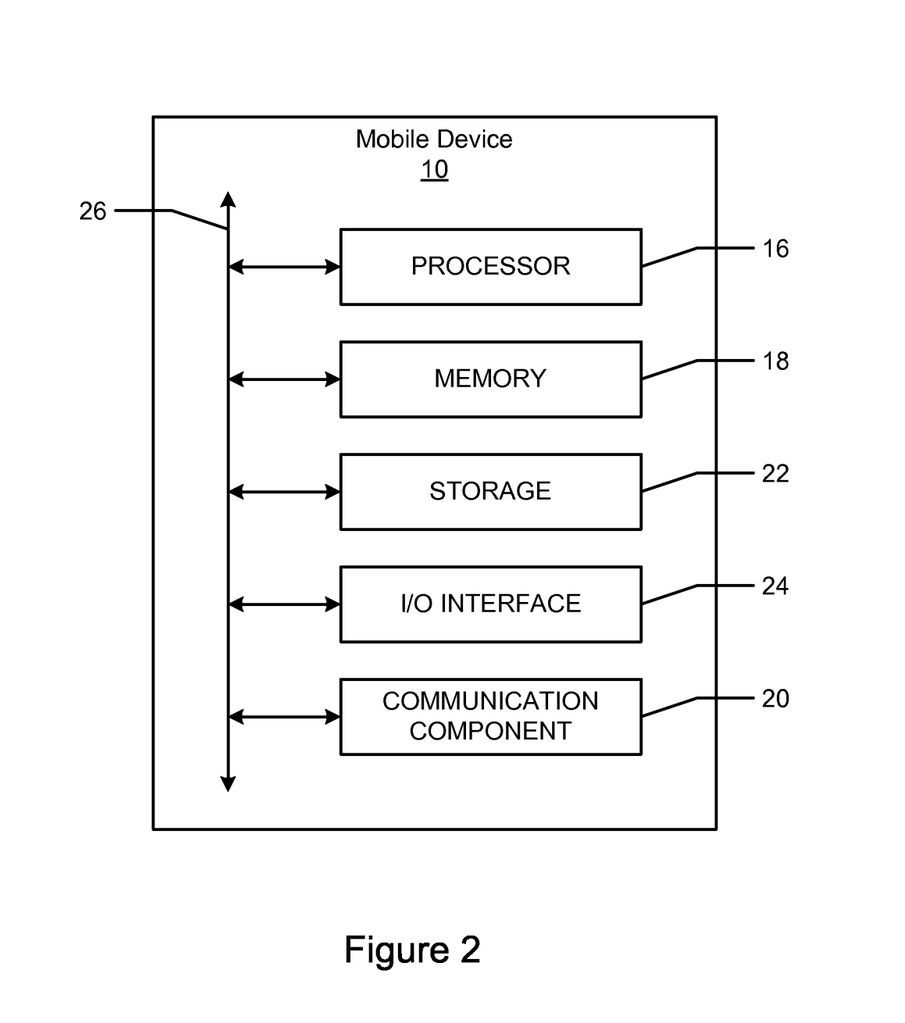
FIG. 2 illustrates example internal components of an example mobile device.

FIG. 2 illustrates example internal components of an example mobile device. Where appropriate, one or more mobile devices 10 may perform without substantial spatial or temporal limitation one or more steps of one or more methods described or illustrated herein. As an example and not by way of limitation, one or more mobile devices 10 may perform in real time or in batch mode one or more steps of one or more methods described or illustrated herein. In particular embodiments, one or more mobile devices 10 performs one or more steps of one or more methods described or illustrated herein. In particular embodiments, one or more mobile devices 10 provides functionality described or illustrated herein. In particular embodiments, software running on one or more mobile devices 10 performs one or more steps of one or more methods described or illustrated herein or provides functionality described or illustrated herein. Particular embodiments include one or more portions of one or more mobile devices 10.

In particular embodiments, mobile device 10 includes a processor 16, memory 18, storage 22, an input/output (I/O) interface 24, a communication component 20, and a bus 26. Although this disclosure describes and illustrates a particular mobile device having a particular number of particular components in a particular arrangement, this disclosure contemplates any suitable mobile device having any suitable number of any suitable components in any suitable arrangement. In particular embodiments, processor 16 includes hardware for executing instructions, such as those making up a computer program or application. As an example and not by way of limitation, to execute instructions, processor 16 may retrieve (or fetch) the instructions from an internal register, an internal cache, memory 18, or storage 22; decode and execute them; and then write one or more results to an internal register, an internal cache, memory 18, or storage 22.

In particular embodiments, processor 16 may include one or more internal caches for data, instructions, or addresses. This disclosure contemplates processor 16 including any suitable number of any suitable internal caches, where appropriate. As an example and not by way of limitation, processor 16 may include one or more instruction caches, one or more data caches, and one or more translation lookaside buffers (TLBs). Instructions in the instruction caches may be copies of instructions in memory 18 or storage 22, and the instruction caches may speed up retrieval of those instructions by processor 16. Data in the data caches may be copies of data in memory 18 or storage 22 for instructions executing at processor 16 to operate on; the results of previous instructions executed at processor 16 for access by subsequent instructions executing at processor 16 or for writing to memory 18 or storage 22; or other suitable data. The data caches may speed up read or write operations by processor 16. The TLBs may speed up virtual-address translation for processor 16. In particular embodiments, processor 16 may include one or more internal registers for data, instructions, or addresses. This disclosure contemplates a processor 16 including any suitable number of any suitable internal registers, where appropriate. Where appropriate, processor 16 may include one or more arithmetic logic units (ALUs); be a multi-core processor; or include one or more processors. Although this disclosure describes and illustrates a particular processor, this disclosure contemplates any suitable processor.

In particular embodiments, software executed by processor 16 may include an operating system (OS). The OS may include a kernel or any number of device drivers corresponding to one or more hardware components of mobile device 10. As an example and not by limitation, if mobile device 10 is a smartphone, then the OS may be a mobile operating system, such as for example, Windows® Phone, Android™, Symbian, iOS®, or Bada. In particular embodiments, one or more software applications may be executed on mobile device 10. In particular embodiments, the applications may be native applications installed and residing on mobile device 10. As an example and not by way of limitation, an application (e.g. Google Maps) may display a map on a touch screen, search for addresses and businesses, or provide directions to a geographic location; a second application may provide remote access to email; a third application (i.e. a web browser) may enable the device user to browse and search the Internet; a fourth application may control a camera to take photos or record videos; and a fifth application may allow the device user to receive and initiate voice-over Internet Protocol (VoIP) or cellular network calls. The software applications may have a user interface (UI) and may implement one or more specific functionalities. The software applications may include one or more software modules implementing the specific functionalities. The executable code of the software applications may be stored in memory 18 or storage 22 of mobile device 10.

In particular embodiments, memory 18 includes main memory for storing instructions for processor 16 to execute or data for processor 16 to operate on. As an example and not by way of limitation, mobile device 10 may load instructions from storage 22 or another source (such as, for example, another mobile device 10) to memory 18. Processor 16 may then load the instructions from memory 18 to an internal register or internal cache. To execute the instructions, processor 16 may retrieve the instructions from the internal register or internal cache and decode them. During or after execution of the instructions, processor 16 may write one or more results (which may be intermediate or final results) to the internal register or internal cache. Processor 16 may then write one or more of those results to memory 18. In particular embodiments, processor 16 executes only instructions in one or more internal registers or internal caches or in memory 18 (as opposed to storage 22 or elsewhere) and operates only on data in one or more internal registers or internal caches or in memory 18 (as opposed to storage 22 or elsewhere).

One or more memory buses (which may each include an address bus and a data bus) may couple processor 16 to memory 18. Bus 26 may include one or more memory buses, as described below. In particular embodiments, one or more memory management units (MMUs) reside between processor 16 and memory 18 and facilitate accesses to memory 18 requested by processor 16. In particular embodiments, memory 18 includes random-access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 18 may include one or more memories, where appropriate. Although this disclosure describes and illustrates particular memory, this disclosure contemplates any suitable memory.

In particular embodiments, storage 22 includes mass storage for data or instructions. As an example and not by way of limitation, storage 22 may include a hard-disk drive (HDD), a floppy disk drive, flash memory, or a combination of two or more of these. Storage 22 may include removable or non-removable (or fixed) media, where appropriate. Storage 22 may be internal or external to mobile device 10, where appropriate. In particular embodiments, storage 22 is non-volatile, solid-state memory. In particular embodiments, storage 22 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 22 taking any suitable physical form. Storage 22 may include one or more storage control units facilitating communication between processor 16 and storage 22, where appropriate. Where appropriate, storage 22 may include one or more storages 22. Although this disclosure describes and illustrates particular storage, this disclosure contemplates any suitable storage.

In particular embodiments, I/O interface 24 includes hardware, software, or both providing one or more interfaces for communication between mobile device 10 and one or more I/O devices. Mobile device 10 may include one or more of these I/O devices, where appropriate. One or more of these I/O devices may enable communication between a user and mobile device 10. As an example and not by way of limitation, an I/O device may include a keyboard, keypad, one or more sensors, touch screen, microphone, monitor, mouse, printer, scanner, speaker, digital still camera, stylus, trackball, video camera, another suitable I/O device or a combination of two or more of these. This disclosure contemplates any suitable I/O devices and any suitable I/O interfaces 24 for them. Where appropriate, I/O interface 24 may include one or more device or software drivers enabling processor 16 to drive one or more of these I/O devices. I/O interface 24 may include one or more I/O interfaces 24, where appropriate. Although this disclosure describes and illustrates a particular I/O interface, this disclosure contemplates any suitable I/O interface.

In particular embodiments, communication component 20 includes hardware, software, or both providing one or more interfaces for communication (such as, for example, packet-based communication) between mobile device 10 and one or more other mobile devices 10 or one or more networks. As an example and not by way of limitation, communication component 20 may include a network interface controller (NIC) or network adapter for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile device 10 may include any suitable communication component for any of these networks, where appropriate. Communication component 20 may include one or more communication components, where appropriate. Although this disclosure describes and illustrates a particular communication component, this disclosure contemplates any suitable communication component.

In particular embodiments, bus 26 includes hardware, software, or both coupling components of mobile device 10 to each other. As an example and not by way of limitation, bus 26 may include a graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a serial advanced technology attachment (SATA) bus, a Video Electronics Standards Association local (VLB) bus, or another suitable bus or a combination of two or more of these. Bus 26 may include one or more buses 26, where appropriate. Although this disclosure describes and illustrates a particular bus, this disclosure contemplates any suitable bus or interconnect.

Figure 3:
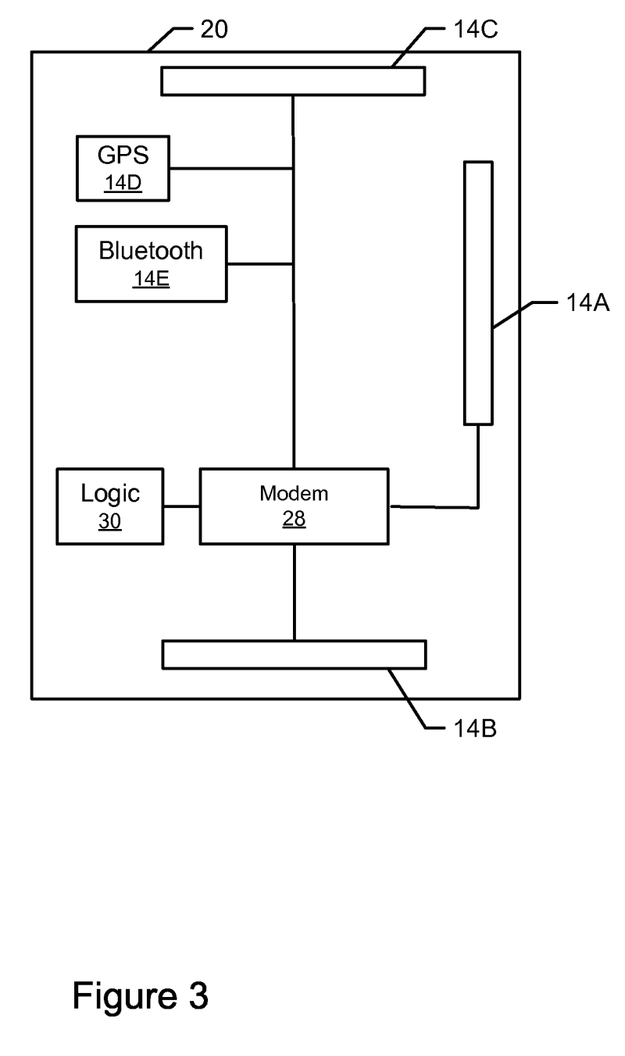
FIG. 3 illustrates an example communication component of an example mobile device.

FIG. 3 illustrates an example communication component of an example mobile device. As described above, communication component 20 of the mobile device may include one or more antennae 14A-E and one or more communication interfaces for wireless communication. As an example and not by way of limitation, antennae 14A-E supports use of wireless communication protocols such as for example, 3G, LTE, Bluetooth®, WI-FI, global-positioning system (GPS), etc. by mobile device 10. Each of the various wireless communication protocols tend to operate within a particular frequency range. Although this disclosure describes and illustrates antennae supporting particular wireless communication protocols, this disclosure contemplates antennae supporting any suitable wireless communication protocols. Modem 28 is coupled to antennae 14A-E and configures antennae 14A-E to operate at the particular frequency (i.e. resonant frequency) associated with the appropriate wireless protocol. Modem 28 is configured to processes the wireless communication signals received by antennae 14A-E. Herein, reference to a modem encompasses any suitable signal processing component that processes analog or digital wireless signals or performs a correction of wireless communication signals. Modem 28 may be coupled to logic 30 of communication component 16 or the processor of the mobile device.

As described above, antennae 14A-E are configured to convert a received EM signal into an electrical signal at the terminals of antennae 14A-E. The electrical signal at the terminals of antennae 14A-E is transmitted to modem 28. In particular embodiments, when the mobile device accesses the Internet through a 3G or LTE data network, a primary antenna 14A and a secondary antenna 14B is used. Modem 28 configures antennae 14A-B for use with one or more wireless protocols. Modem 28 is configured to optimize the efficiency of the power transfer between the antennae and the modem within the frequency range associated with the wireless protocol used by the mobile device, as described below. In particular embodiments, modem 28 transmits data encoding a response shift in the signals received by the mobile device to logic 30. Logic 30 may be configured to process the encoded response-shift data received from modem 28 and initiate changes to the configuration of the mobile device based on the received response-shift data. In particular embodiments, logic 30 may receive the encoded-shift data from modem 28 through an application programming interface (API). In other particular embodiments, logic 30 may receive an interrupt in response to a change in the response-shift data received by modem 28. Although this disclosure describes particular methods of communicating information between the logic and modem, this disclosure contemplates communicating information between the logic and modem through any suitable methods, such as for example using an API, using an interrupt, or a combination of API and interrupt.

Figure 4A:
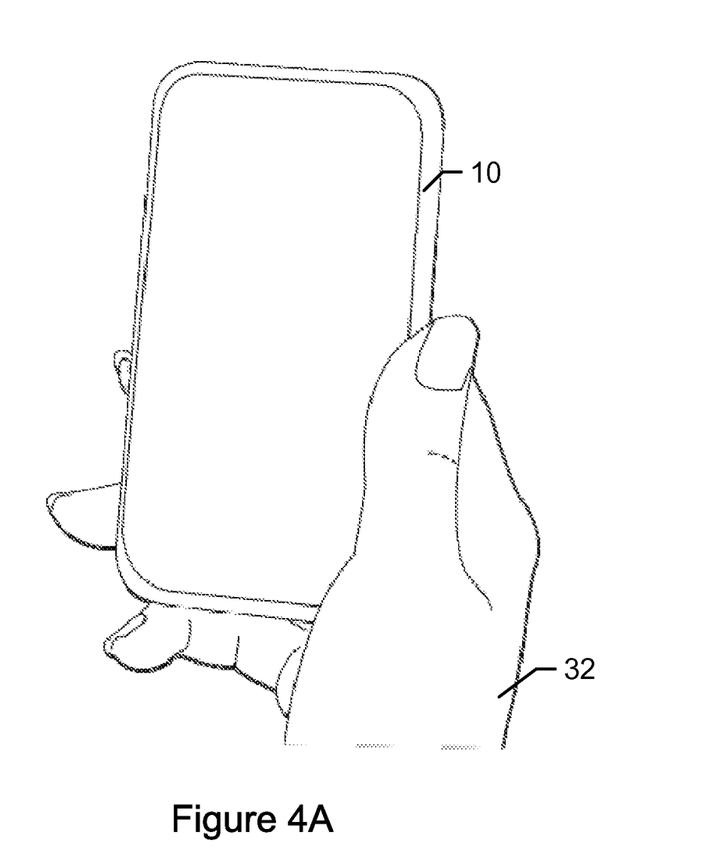
FIGS. 4A-B illustrate an example use and signals of an example mobile device.
Figure 4B:
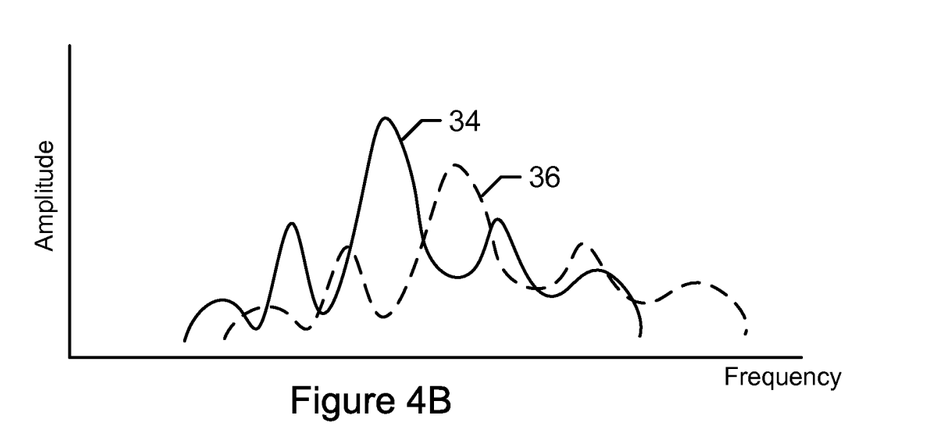

FIGS. 4A-B illustrate an example use and signals of an example mobile device. Modem 28 configures to the antennae of mobile device 10 to efficiently receive and transmit wireless communication signals. During use, mobile device 10 may be held by a hand 32 of a user of mobile device 10, as illustrated in the example of FIG. 4A. The presence of hand 32 near one or more of the antennae of mobile device 10 may alter or interfere with the signal received by the antennae. As an example and not by way of limitation, interference from hand 32 shifts the frequency or de-tunes reception of the signal received by the antennae of mobile device 10 due at least in part to skin, as well as water and iron contained in the blood of hand 32.

In the example of FIG. 4B, spectrum 34 illustrates an example spectrum of the wireless communication signal received by the antennae without interference. Spectrum 36 illustrates an example frequency shift of the wireless communication signal with the presence of hand 32 near one or more of the antennae. The modem of mobile device 10 modifies the configuration of the antennae to increase the efficiency of the power transfer between the antennae and the modem. In particular embodiments, the impedance of the antennae is adjusted such that the difference between resonant frequency of the antennae and the frequency of the peak amplitude of the wireless communication signals is minimized. Although this disclosure describes and illustrates particular sources and characteristics of signal interference, this disclosure contemplates interference resulting from any suitable source of or measuring any suitable characteristic associated with signal interference, such as for example a frequency, phase, or amplitude response shift.

In particular embodiments, the modem of mobile device 10 transmits information corresponding to the shift of the resonant frequency of the antennae to the logic of the communication component through an API, as described above. As an example and not by way of limitation, the frequency shift of the wireless communication signal may be due at least in part to interference with hand 32. As another example, the frequency shift may be due at least in part to interference from inanimate objects, such as for example, fabric of a pocket. In particular embodiments, the logic of mobile device 10 is able to differentiate between interference resulting from different sources through analysis of the shift of the resonant frequency of the antennae, which in turn is indicative of the frequency shift of the received wireless communication signals. The logic of mobile device 10 is able to differentiate between interference resulting from hand 32 and interference resulting from the mobile device being placed in a pocket based on the amount or pattern of frequency shift resulting from different sources of interference.

As an example and not by way of limitation, the logic of mobile device 10 may receive an interrupt in response to the modem detecting a change in the signal from one source of interference to another source of interference. As another example, the response-shift information received from the modem may be compared with response-shift information associated with hand 32 or inanimate objects. Based on this comparison, the logic may transmit data to the modem to reconfigure one or more antennae of mobile device 10. As an example and not by way of limitation, based on the response-shift information, the logic may determine mobile device 10 is being held in hand 32 of a user. Based on the determination, the logic may transmit a configuration signal to the modem to swap the functions of a primary antenna with a secondary antenna to increase the efficiency of the power transfer between the antennae and the modem. Or the modem may configure mobile device 10 to use one or more antennae configured for a different wireless communication protocol, e.g. from 3G to GPS, to increase the efficiency of the power transfer between the antennae and the modem.

In particular embodiments, an user profile may be created that compiles characteristic information associated with the user of the mobile device. The characteristic information may be inferred from data collected by one or more sources, such as for example GPS information and response-shift information from the antennae. As an example and not by way of limitation, the characteristic information of the user profile may indicate the user holds mobile device 10 in hand 32 while at a work location, places mobile device 10 in a pocket while at a public place (e.g. restaurant), or places mobile device 10 on top of a table while at a place of residence. In particular embodiments, the communication and sensor components of mobile device 10 may configured based on the user profile. As an example and not by way of limitation, the configuration signal may re-route signals away the primary antenna to a secondary antenna based on the user profile determining the user is at a work location and holding mobile device 10 in hand 32. As another example, the volume of the speakers may be increased based on the user profile and the user having mobile device 10 in a pocket while at a public location. In addition, touch sensing of the touch screen of mobile device 10 may be suppressed if the environmental state indicates mobile device 10 is inside the pocket of the user. As another example, the display of mobile device 10 may be darkened and the touch screen of the mobile device may be disabled to minimize power consumption of mobile device 10 when mobile device 10 is placed on a table at a place of residence. Operation of the touch screen and the display may be resumed in response to the environmental state indicating physical contact with mobile device 10 by the user.

Figure 5:
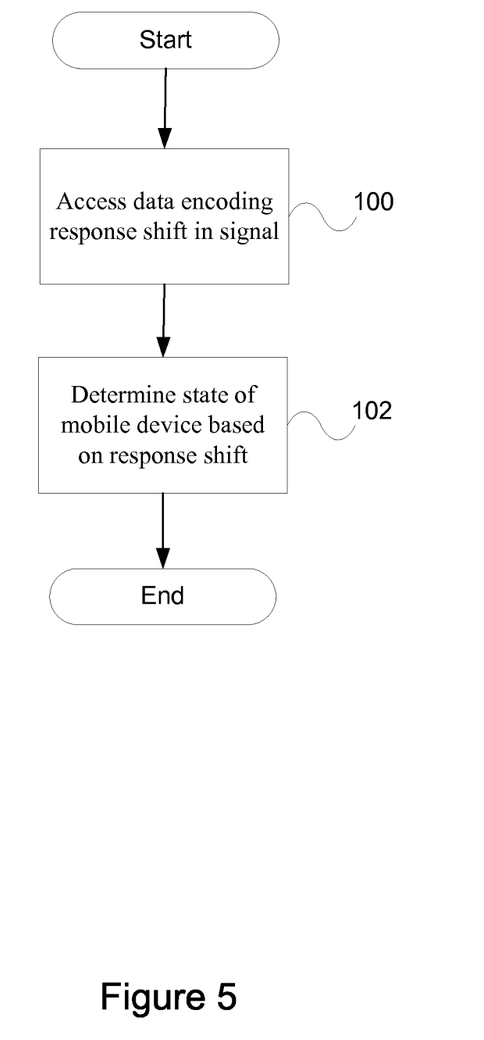
FIG. 5 illustrates an example method for determining the environmental or operational state of a mobile device.

FIG. 5 illustrates an example method for determining the environmental or operational state of a mobile device. The method may start at step 100, where data encoding a response shift in a signal received through an antenna of a mobile device is accessed. In particular embodiments, the signal corresponds to wireless communication to the mobile device from another device. In particular embodiments, the response shift is detected and encoded by a modem of the mobile device coupled to the antenna. At step 102, an environmental or operational state of the mobile device is determined based at least in part on the response shift encoded in the data. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Herein, reference to a computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, or any other suitable computer-readable storage medium or media), or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving a signal through a first antenna that has a first resonant frequency, wherein the signal corresponds to a wireless communication to the computing device from another device, wherein the signal has a peak amplitude at one or more frequencies;
by the computing device, accessing data encoding a frequency response shift corresponding to interference in the received signal, the frequency response shift being detected and encoded by a modem of the computing device coupled to the first antenna;
by the computing device, determining an environmental or operational state of the computing device based at least in part on the frequency response shift encoded in the data; and
by the computing device, in response to the determination of the state of the computing device, swapping a function from the first antenna to a second antenna based at least in part on the frequency response shift, wherein the second antenna has a second resonant frequency, and wherein a difference between the second resonant frequency and at least one of the one or more frequencies is less than a difference between the first resonant frequency and any of the one or more frequencies.

2. The method of claim 1, wherein a source of the interference comprises an object coming into proximity or contact with the computing device.

3. The method of claim 2, wherein the environmental state comprises one or more of:
the computing device is in physical contact with a user;
the computing device has been placed in a pocket; or
the computing device has been placed on a table.

4. The method of claim 1, further comprising by the computing device, initiating a pre-determined function of the computing device in response to the environmental or operational state.

5. The method of claim 4, wherein the pre-determined function comprises resuming operation of the computing device in response to physical contact with the computing device.

6. The method of claim 1, wherein the wireless communication substantially complies with a Global System for Mobile Communications (GSM) standard.

7. The method of claim 1, wherein the environmental state comprises one or more of:
the computing device is at a work location;
the computing device is at a residence; or
the computing device is at a public place.

8. One or more computer-readable non-transitory storage media embodying logic configured when executed to:
receive a signal through a first antenna that has a first resonant frequency, wherein the signal corresponds to a wireless communication to a computing device from another device, wherein the signal has a peak amplitude at one or more frequencies;
access data encoding a frequency response shift corresponding to interference in the received signal, the frequency response shift being detected and encoded by a modem of the computing device coupled to the first antenna;
determine an environmental or operational state of the computing device based at least in part on the frequency response shift encoded in the data; and
in response to the determination of the state of the computing device, swap a function from the first antenna to a second antenna based at least in part on the frequency response shift, wherein the second antenna has a second resonant frequency, and wherein a difference between the second resonant frequency and at least one of the one or more frequencies is less than a difference between the first resonant frequency and any of the one or more frequencies.

9. The media of claim 8, wherein a source of the interference comprises an object coming into proximity or contact with the computing device.

10. The media of claim 8, wherein the wireless communication substantially complies with a Global System for Mobile Communications (GSM) standard.

11. The media of claim 8, wherein the logic is further configured to initiate a pre-determined function of the device in response to the environmental or operational state.

12. The media of claim 11, wherein the pre-determined function comprises resuming operation of the device in response to physical contact with the device.

13. The media of claim 11, wherein the environmental state comprises one or more of:
the computing device is in physical contact with a user;
the computing device has been placed in a pocket; or
the computing device has been placed on a table.

14. The media of claim 8, wherein the environmental state comprises one or more of:
the computing device is at a work location;
the computing device is at a residence; or
the computing device is at a public place.

15. A device comprising:
one or more antennae; and
one or more computer-readable non-transitory storage media coupled to one or more of the antennae and embodying logic configured when executed to:
receive a signal through a first antenna that has a first resonant frequency, wherein the signal corresponds to a wireless communication from another device, wherein the signal has a peak amplitude at one or more frequencies;
access data encoding a frequency response shift corresponding to interference in the received signal, the frequency response shift being detected and encoded by a modem coupled to a first one of the antennae;
determine an environmental or operational state based at least in part on the frequency response shift encoded in the data; and
in response to the determination of the state, swap a function from the first one of the antennae to a second one of the antennae based at least in part on the frequency response shift, wherein the second antenna has a second resonant frequency, and wherein a difference between the second resonant frequency and at least one of the one or more frequencies is less than a difference between the first resonant frequency and any of the one or more frequencies.

16. The device of claim 15, wherein a source of the interference comprises an object coming into proximity or contact with the device.

17. The device of claim 16, wherein the environmental state comprises one or more of:
the computing device is in physical contact with a user;
the computing device has been placed in a pocket; or
the computing device has been placed on a table.

18. The device of claim 15, wherein the logic is further configured to initiate a pre-determined function of the device in response to the environmental or operational state.

19. The device of claim 18, wherein the pre-determined function comprises resuming operation of the device in response to physical contact with the device.

20. The device of claim 15, wherein the wireless communication substantially complies with a Global System for Mobile Communications (GSM) standard.

21. The device of claim 15, wherein the environmental state comprises one or more of:
the computing device is at a work location;
the computing device is at a residence; or
the computing device is at a public place.

* * * * *